E. V. BROWN.
STEAM GENERATOR.
APPLICATION FILED NOV. 11, 1916.
1,235,764.
Patented Aug. 7, 1917.
2 SHEETS—SHEET 1.
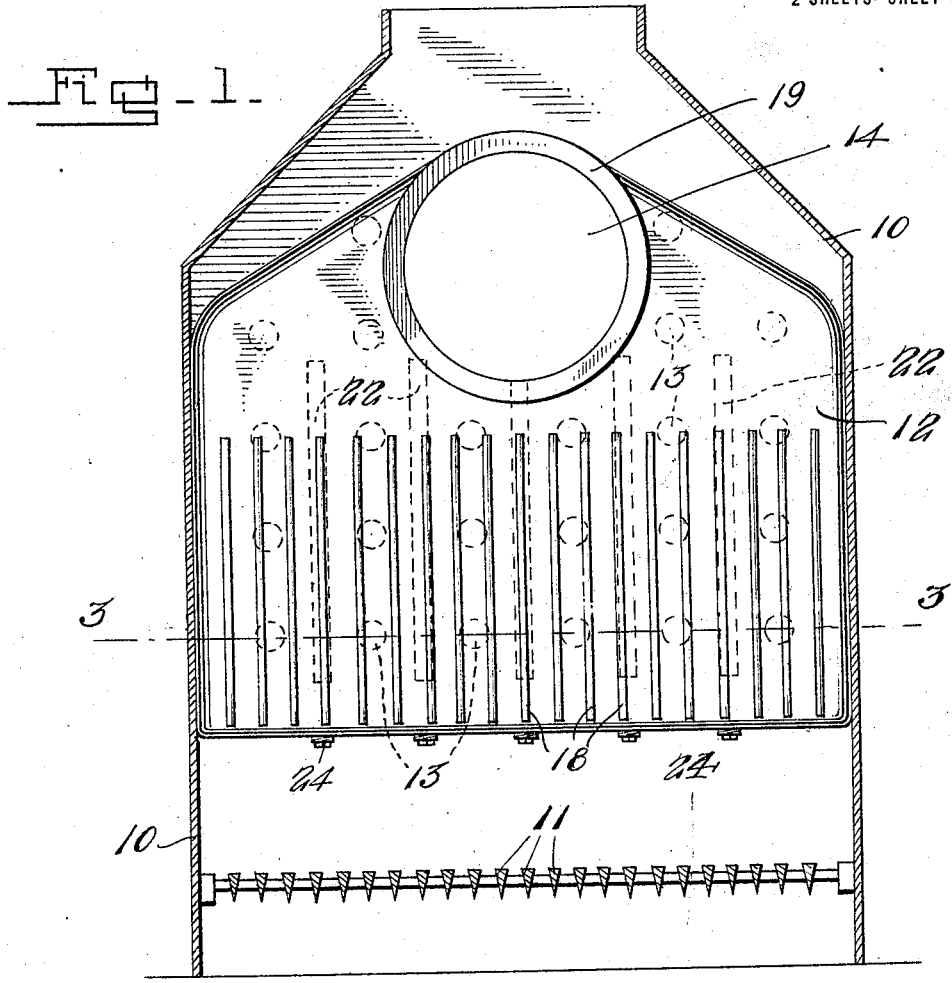
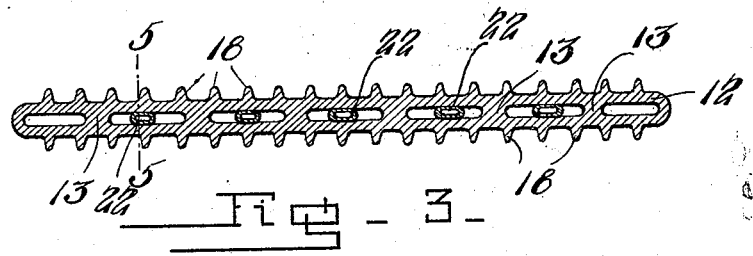
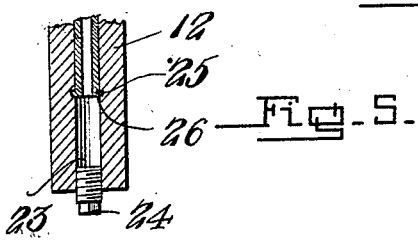
Inventor
Edward V. Brown,
By Lancaster and Allwine
His Attorneys

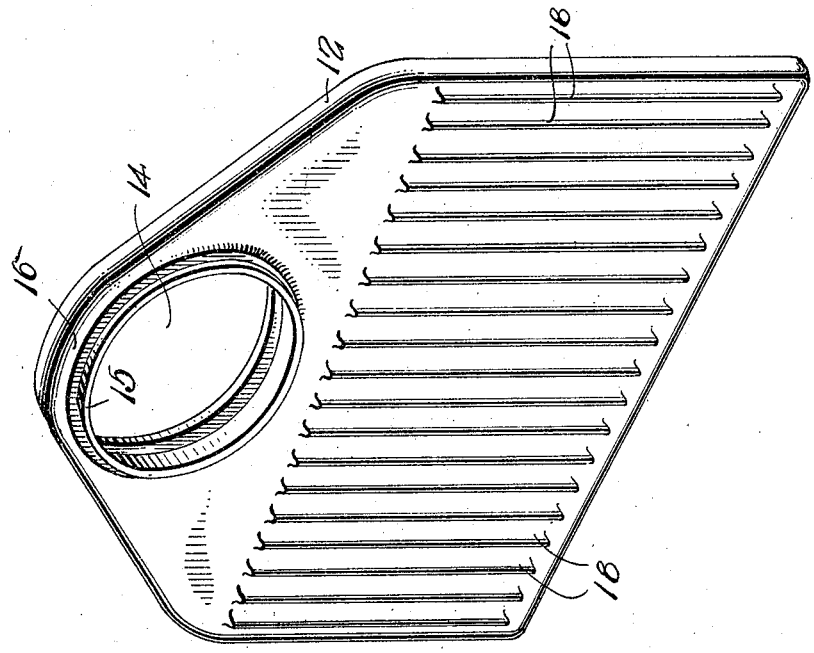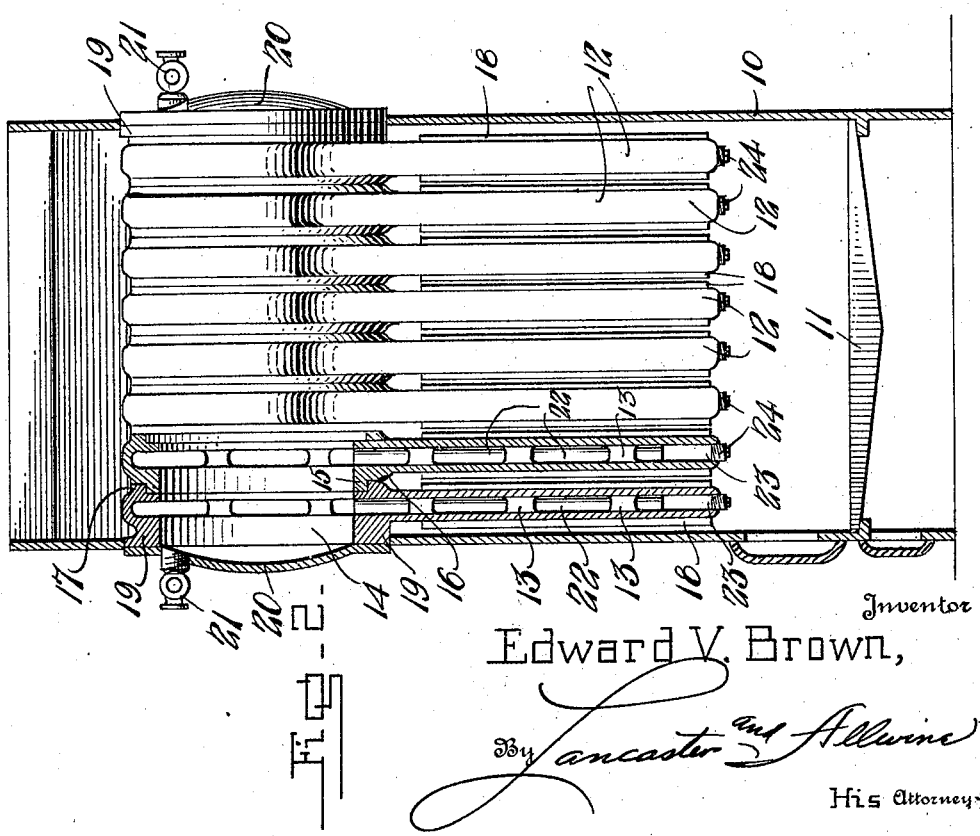

UNITED STATES PATENT OFFICE.

EDWARD V. BROWN, OF LOS ANGELES, CALIFORNIA.

STEAM-GENERATOR.

1,235,764.  Specification of Letters Patent.  Patented Aug. 7, 1917.

Application filed November 11, 1916. Serial No. 130,787.

*To all whom it may concern:*

Be it known that I, EDWARD V. BROWN, a citizen of the United States, and a resident of Los Angeles, in the county of Los Angeles and State of California, have invented a certain new and useful Improvement in Steam-Generators, of which the following is a specification.

The present invention relates to steam generators, and has particular reference to a generator adapted for high pressure use, such as in motor vehicles, marine work, and for various stationary work.

It is an object of the present invention to provide a steam generator which is composed of a plurality of sections of relatively simple construction, and which has a maximum heating surface for a minimum amount of space and weight.

The invention further aims at the provision of a steam generator of this character, having the sections thereof so formed that they may be readily assembled, and sections securely fastened together so as to provide a steam-tight composite structure adapted to withstand high pressure steam, and which is of such construction that the sections may each be made of an integral aluminum casting, or any suitable metal.

Various other objects and advantages of this invention, as well as the above, will be more clearly brought out in the following specific description of the present preferred embodiment of this invention, the same being illustrated in the accompanying drawings wherein:

Figure 1 is a front elevation of a steam generator constructed according to the present invention, the casing and other parts being shown in section.

Fig. 2 is a longitudinal vertical section taken through the steam generator shown in Fig. 1, the section being taken centrally through the same.

Fig. 3 is a transverse section taken on the line 3—3 of Fig. 1, showing in detail one of the steam generator sections.

Fig. 4 is a detail perspective view, enlarged, of one of the steam generator sections.

Fig. 5 is a detail enlarged sectional view taken on the line 5—5 of Fig. 3, showing the mounting of the lower end of one of the circulating tubes in the steam generator sections.

Referring to these drawings, wherein like parts are designated by similar characters of reference throughout the several views, 10 designates a suitable casing provided in its lower end with grate bars 11, or other suitable supports for a heating element. The top of the casing 10 is open and is adapted to be connected to a suitable flue for carrying off the products of combustion after passing upwardly through the improved steam generator which is mounted in the casing.

The steam generator comprises a plurality of sections 12 which are preferably cast in one piece, and may be made of aluminum, or other light strong metal. Each section 12 comprises a pair of closely-spaced-apart walls which are connected together and reinforced by a plurality of spaced-apart webs or studs 13. The section 12 is provided in its upper end with a relatively large transversely extending opening 14, the same being formed by providing registering openings in the closely-spaced-apart walls of the section.

From Figs. 1 and 4, it will be noted that the upper end of the section 12 is tapered or reduced. One of the walls or sides of the section 12 is provided, at the marginal edge of the opening therethrough, with an outwardly extending flange 15 surrounded by an annular shoulder 16. The opposite wall of the section 12 is provided with an annular outstanding flange 17 which is spaced outwardly from the marginal edge of the adjacent opening, which is adapted to receive therein the flange 15 of the next adjacent section, and which is adapted to abut against the shoulder 16 of said adjacent section. Preferably, this flange 17 is adapted to be welded to the shoulder 16 in order to firmly unite the sections of the steam generator and prevent leakage between the same.

When a row of sections 12 are secured together in this manner, they intercommunicate through the opening 14, the latter providing a relatively large water and steam space extending from end to end of the composite generator. The opposed walls of each section are provided, upon their outer faces, with spaced-apart vertically extending ribs 18 which extend from a point adjacent to the lower end of each section, to a point adjacent to the lower marginal edge of the opening 14. These ribs 18 not only reinforce the walls of the sections, but they also serve as heat-absorbing units for more quickly heating the contents of the sections. The shoulder 16, and flanges 17 of the sections are of such thickness that when the sections are assembled the ribs 18 thereof are spaced-apart slightly so as to provide a passage upwardly between the sections for the products of combustion, and to permit the products of combustion to play against the flanges 17 and the shoulder 16 to insure the utilization of all of the heat units produced in the casing 10.

The outer side of the end sections, as shown in Fig. 2, are provided with enlarged supporting and head-retaining flanges 19. Headers 20 are bolted or otherwise suitably secured against these flanges 19 and provide end closures for the cylindrical chambers formed in the upper ends of the sections 12. The opposite ends of the casing 10 are preferably apertured to snugly receive the flanges 19 therethrough for the purpose of supporting the assembled sections, and for receiving the headers 20 therethrough to protect valves or couplings 21 from the intense heat generated within the casing 10. The valves or couplings are connected directly to the headers 20 and are used for carrying off steam therefrom, and for feeding water to the steam generator.

The webs 13 are arranged in vertical rows, as shown to advantage in Figs. 1 and 2, and between each row of the webs is preferably placed a circulating tube 22. The tubes 22 are introduced upwardly into the sections 12 through threaded openings 23 formed in the bottom of the sections, and which are preferably closed by screw-threaded plugs 24. To retain the tubes 22 in position with their lower ends spaced above the bottoms of the sections, the opposed walls of the sections are grooved, as at 25, in Fig. 5, and the lower ends of the tubes 22 are flared or flanged outwardly at their lower ends, as at 26 for engagement in the grooves 25 to support the tubes in proper position. These tubes 25 permit of the downward flow of water in the sections 12, and terminate at their upper ends adjacent to the plane of the lower marginal edge of the opening 14.

In the use of the steam generator, the water level should be maintained slightly above the upper ends of the circulating tubes 22, and the upper ends of the sections provide a relatively large steam space which extends throughout the entire line of the sections.

It is of course understood that various changes and modifications may be made in the specific details of construction of the above-described generator and the sections comprising the same, without departing from the spirit of this invention, and being restricted only by the scope of the following claims.

I claim:

1. A steam generator comprising a plurality of flat hollow sections having registering intercommunicating openings through their upper ends and being independently closed at their lower ends, said sections also having interlocking flanges about the openings, and headers secured over the openings of the end sections.

2. A steam generator unit comprising an integral casting provided with spaced-apart walls having integral stays therebetween for reinforcing the walls, said walls being provided with relatively large registering openings therethrough at the upper end of the unit to provide a passageway through the top of the unit and being closed at the lower end of the unit, and having on their outer faces and about said openings opposed large and small flanges and an abutting shoulder about the small flange whereby a plurality of the units may be assembled.

3. As an article of manufacture, a steam generator unit comprising an integral casting having closely-spaced-apart walls reinforced by integral stays between the walls, said walls being provided at one end with relatively large openings therethrough providing a passageway through said end of the unit, the casting also having interlocking flanges on its opposite sides about said openings, and provided in its lower end with threaded openings registering between said vertical stays, and circulating tube-retaining means above the threaded openings.

4. In a steam generator, a casing, a plurality of sections, said sections being provided with intercommunicating through passages at their upper ends and having interlocking flanges about said passages, the end sections being provided with supporting flanges adapted for engagement through the opposite ends of said casing, headers secured to said supporting flanges beyond the ends of the casing, and means connected to said headers outside of the casing for communication with the interior of the sections.

5. In a steam generator, a plurality of hollow sections, each of said sections having an opening formed through the upper end thereof and being independently closed as its lower end, interlocking flanges outstanding from the sections around said openings and adapted to be interlocked to provide a through passage extending from end to end of the generator, and circulating tubes arranged in the lower ends of the sections and being spaced from the bottoms thereof to induce circulation of water through the sections.

6. In a steam generator, a unit comprising a flat hollow body provided with a threaded opening in its bottom, a tube adapted for insertion through said opening upwardly into the hollow body and having an outstanding bead upon its lower end, said body being provided with registering grooves in its opposed walls adapted to receive said bead and retain the tube in adjusted position, and a detachable plug adapted to close the opening in the bottom of said section.

7. In a steam generator, a unit comprising a body portion having spaced-apart walls reinforced by integral stays, said body portion having a plurality of threaded openings in its lower end, plugs detachably closing said openings, a circulating tube adapted for engagement through each of said openings upwardly into the body, the opposed walls of the body being provided with grooves therein, and an outstanding flange formed upon the lower end of each of said tubes adapted to be sprung into said grooves for retaining the tubes in position.

EDWARD V. BROWN.